US008045536B2

(12) United States Patent
Proctor, Jr.

(10) Patent No.: US 8,045,536 B2
(45) Date of Patent: Oct. 25, 2011

(54) FORWARD ERROR CORRECTION SCHEME FOR HIGH RATE DATA EXCHANGE IN A WIRELESS SYSTEM

(75) Inventor: James A. Proctor, Jr., Indialantic, FL (US)

(73) Assignee: IPR Licensing, Inc., Wilmington, DE (US)

( * ) Notice: Subject to any disclaimer, the term of this patent is extended or adjusted under 35 U.S.C. 154(b) by 453 days.

(21) Appl. No.: 12/110,930

(22) Filed: Apr. 28, 2008

(65) Prior Publication Data
US 2009/0055707 A1    Feb. 26, 2009

Related U.S. Application Data

(63) Continuation of application No. 10/634,148, filed on Aug. 4, 2003, now Pat. No. 7,366,154, which is a continuation of application No. 09/301,484, filed on Apr. 28, 1999, now Pat. No. 6,614,776.

(51) Int. Cl.
*H04B 7/216* (2006.01)

(52) U.S. Cl. ........ 370/342; 370/320; 370/329; 370/334; 370/335; 370/441; 370/535; 370/536; 370/541; 370/542; 375/135; 375/136; 375/137; 375/149; 375/141

(58) Field of Classification Search .......... 370/342, 370/320
See application file for complete search history.

(56) References Cited

U.S. PATENT DOCUMENTS

| 4,460,992 | A | 7/1984 | Gutleber |
| 4,625,308 | A | 11/1986 | Kim et al. |
| 4,862,453 | A | 8/1989 | West et al. |
| 4,866,709 | A | 9/1989 | West et al. |
| 5,027,348 | A | 6/1991 | Curry |
| 5,103,459 | A | 4/1992 | Gilhousen et al. |
| 5,115,309 | A | 5/1992 | Hang |
| 5,373,502 | A | 12/1994 | Turban |
| 5,394,473 | A | 2/1995 | Davidson |
| 5,410,538 | A | 4/1995 | Roche et al. |
| 5,414,728 | A | 5/1995 | Zehavi |
| 5,442,625 | A | 8/1995 | Gitlin et al. |
| 5,487,072 | A | 1/1996 | Kant |
| 5,559,788 | A | 9/1996 | Zscheile, Jr. et al. |
| 5,559,790 | A | 9/1996 | Yano et al. |

(Continued)

FOREIGN PATENT DOCUMENTS

EP    0443061    2/1990

(Continued)

OTHER PUBLICATIONS

Attachment 2, High Speed Data RLP Lucent Technologies, Version 0.1, Jan. 16, 1997.

(Continued)

*Primary Examiner* — Nay A Maung
*Assistant Examiner* — Richard Chan
(74) *Attorney, Agent, or Firm* — Volpe and Koenig, P.C.

(57) ABSTRACT

A transmitter/receiver system for high data transfer in a wireless communication system includes a physical layer processor that comprises an FEC coder, a demultiplexer and a plurality of modem processors. The FEC coder applies error correction codes to the high data rate signal. Thereafter, the demultiplexer distributes portions of the coded high data rate signal to the modem processors. Each modem processor processes its respective portion of the coded signal for transmission in an independent channel.

16 Claims, 1 Drawing Sheet

U.S. PATENT DOCUMENTS

| | | | |
|---|---|---|---|
| 5,602,834 | A | 2/1997 | Dean et al. |
| 5,606,574 | A | 2/1997 | Hasegawa et al. |
| 5,608,725 | A | 3/1997 | Grube et al. |
| 5,663,958 | A | 9/1997 | Ward |
| 5,663,990 | A | 9/1997 | Bolgiano et al. |
| 5,673,259 | A | 9/1997 | Quick, Jr. |
| 5,699,364 | A | 12/1997 | Sato et al. |
| 5,699,369 | A | 12/1997 | Guha |
| 5,734,646 | A | 3/1998 | I et al. |
| 5,777,990 | A | 7/1998 | Zehavi et al. |
| 5,781,542 | A | 7/1998 | Tanaka et al. |
| 5,784,406 | A | 7/1998 | DeJaco et al. |
| 5,790,551 | A | 8/1998 | Chan |
| 5,805,567 | A | 9/1998 | Ramesh |
| 5,812,938 | A * | 9/1998 | Gilhousen et al. ............... 455/69 |
| 5,825,807 | A | 10/1998 | Kumar |
| 5,828,659 | A | 10/1998 | Teder et al. |
| 5,828,662 | A | 10/1998 | Jalali et al. |
| 5,844,894 | A | 12/1998 | Dent |
| 5,856,971 | A | 1/1999 | Gitlin et al. |
| 5,859,840 | A | 1/1999 | Tiedemann, Jr. et al. |
| 5,862,133 | A * | 1/1999 | Schilling ........................ 370/342 |
| 5,910,945 | A | 6/1999 | Garrison et al. |
| 5,914,950 | A | 6/1999 | Tiedemann, Jr. et al. |
| 5,917,852 | A | 6/1999 | Butterfield et al. |
| 5,923,650 | A | 7/1999 | Chen et al. |
| 5,930,230 | A | 7/1999 | Odenwalder et al. |
| 5,950,131 | A | 9/1999 | Vilmur |
| 5,991,279 | A | 11/1999 | Haugli et al. |
| 6,005,855 | A | 12/1999 | Zehavi et al. |
| 6,028,868 | A | 2/2000 | Yeung et al. |
| 6,061,359 | A * | 5/2000 | Schilling et al. ............... 370/441 |
| 6,064,678 | A | 5/2000 | Sindhushayana et al. |
| 6,069,883 | A | 5/2000 | Ejzak |
| 6,078,572 | A | 6/2000 | Tanno et al. |
| 6,088,335 | A | 7/2000 | I et al. |
| 6,104,708 | A | 8/2000 | Bergamo |
| 6,112,092 | A | 8/2000 | Benveniste |
| 6,134,233 | A | 10/2000 | Kay |
| 6,151,332 | A | 11/2000 | Gorsuch et al. |
| 6,157,619 | A | 12/2000 | Ozluturk et al. |
| 6,161,013 | A | 12/2000 | Anderson et al. |
| 6,195,362 | B1 | 2/2001 | Darcie et al. |
| 6,208,871 | B1 | 3/2001 | Hall et al. |
| 6,215,798 | B1 | 4/2001 | Carneheim et al. |
| 6,222,828 | B1 | 4/2001 | Ohlson et al. |
| 6,243,372 | B1 | 6/2001 | Petch et al. |
| 6,259,683 | B1 | 7/2001 | Sekine et al. |
| 6,259,724 | B1 * | 7/2001 | Esmailzadeh ................. 375/143 |
| 6,262,971 | B1 * | 7/2001 | Schilling ........................ 370/208 |
| 6,262,980 | B1 | 7/2001 | Leung et al. |
| 6,269,088 | B1 | 7/2001 | Masui et al. |
| 6,272,168 | B1 | 8/2001 | Lomp et al. |
| 6,285,665 | B1 | 9/2001 | Chuah |
| 6,307,840 | B1 | 10/2001 | Wheatleyl, III et al. |
| 6,366,570 | B1 | 4/2002 | Bhagalia |
| 6,373,830 | B1 | 4/2002 | Ozluturk |
| 6,373,834 | B1 | 4/2002 | Lundh et al. |
| 6,377,548 | B1 | 4/2002 | Chuah |
| 6,377,809 | B1 | 4/2002 | Rezaiifar et al. |
| 6,389,000 | B1 | 5/2002 | Jou |
| 6,396,804 | B2 | 5/2002 | Odenwalder |
| 6,418,148 | B1 | 7/2002 | Kumar et al. |
| 6,456,608 | B1 | 9/2002 | Lomp |
| 6,469,991 | B1 | 10/2002 | Chuah |
| 6,473,623 | B1 | 10/2002 | Benveniste |
| 6,504,830 | B1 | 1/2003 | Östberg et al. |
| 6,515,981 | B1 * | 2/2003 | Schilling et al. ............... 370/342 |
| 6,519,651 | B1 | 2/2003 | Dillon |
| 6,526,039 | B1 | 2/2003 | Dahlman et al. |
| 6,532,365 | B1 | 3/2003 | Anderson et al. |
| 6,545,986 | B1 | 4/2003 | Stellakis |
| 6,567,416 | B1 | 5/2003 | Chuah |
| 6,570,865 | B2 | 5/2003 | Masui et al. |
| 6,571,296 | B1 | 5/2003 | Dillon |
| 6,574,211 | B2 | 6/2003 | Padovani et al. |
| 6,590,873 | B1 * | 7/2003 | Li et al. ......................... 370/318 |
| 6,597,913 | B2 | 7/2003 | Natarajan |
| 6,614,776 | B1 | 9/2003 | Proctor |
| 6,850,506 | B1 * | 2/2005 | Holtzman et al. ............. 370/335 |
| 6,885,652 | B1 | 4/2005 | Ozukturk et al. |
| 6,940,840 | B2 | 9/2005 | Ozluturk et al. |
| 6,973,601 | B2 | 12/2005 | Sabet et al. |
| 7,209,709 | B2 * | 4/2007 | Miyazaki et al. ........... 455/67.11 |
| 7,257,147 | B1 * | 8/2007 | Mack et al. .................... 375/142 |
| 7,263,089 | B1 * | 8/2007 | Hans et al. ..................... 370/349 |
| 7,289,476 | B2 * | 10/2007 | Varshney et al. .............. 370/335 |
| 7,327,775 | B1 * | 2/2008 | Gu ................. 375/130 |
| 7,366,154 | B2 * | 4/2008 | Proctor, Jr. .................... 370/342 |
| 7,636,382 | B1 * | 12/2009 | Mack et al. .................... 375/142 |

FOREIGN PATENT DOCUMENTS

| | | |
|---|---|---|
| EP | 0635949 | 7/1994 |
| EP | 0720309 | 7/1996 |
| EP | 0827312 | 8/1997 |
| FR | 2266389 | 4/1974 |
| FR | 2761557 | 3/1997 |
| WO | 95/08900 | 3/1995 |
| WO | 96/27250 | 9/1995 |
| WO | 96/13914 | 5/1996 |
| WO | 96/27250 | 9/1996 |
| WO | 97/26726 | 7/1997 |
| WO | 98/43373 | 10/1998 |
| WO | 98/59447 | 12/1998 |
| WO | 99/14878 | 3/1999 |
| WO | 99/39472 | 8/1999 |
| WO | 99/44341 | 9/1999 |
| WO | 00/52831 | 9/2000 |
| WO | 00/65764 | 11/2000 |

OTHER PUBLICATIONS

Author Unknown, "North American Cellular System Based on Code Division Multiple Access." pp. 203-254.

Azad et al., "Multirate Spread Spectrum Direct Sequence CDMA Techniques," 1994, The Institute of Electrical Engineers.

Bell Labs Technical Journal, Lucent Technologies, vol. 2, No. 3, Summer 1997.

Budka et al., "Cellular Digital Packet Data Networks," Bell Labs Technical Journal, Summer 1997, pp. 164-181.

Cellular Digital Packet Data, System Specification, Release 1.1 Jan. 19, 1995.

Chen Q et al., "Multicarrier CDMA With Adaptive Frequency Hopping for Mobile Radio Systems", IEEE Journal on selected areas in communications, vol. 14, No. 9, Dec. 1996, pp. 1852-1858, XP000639647.

Chung, "Packet Synchronization and Identification for Incremental Redundancy Transmission in FH-CDMA Systems," 1992, IEEE, pp. 292-295.

Data Service Option for Wideband Spread Spectrum Systems, TIA/EIA Interim Standard, TIA/EIA/IS 707.

Data Service Options for Wideband Spread Spectrum Systems. TIA/EIA Interim Standard. TIA/EIA/IS-707-A. Apr. 1999.

Data Service Options for Wideband Spread Spectrum Systems: Introduction, PN-3676. 1 (to be published as TIA/EIA/IS-707.1), Mar. 20, 1997 (Content Revision 1).

Data Services Option Standard for Wideband Spread Spectrum Digital Cellular System. TIA/EIA/IS-99. TIA/EIA Interim Standard. Jul. 1995.

Data Services Options Standard for Wideband Spread Spectrum Systems: Packet Data Services. PN-3676.5 (to be published as TIA/EIA/IS-707.5) Ballot Version, May 30, 1997.

Data Standard, Packet Data Section, PN-3676.5 (to be published as TIA/EIA/IS-DATA.5), Dec. 8, 1996, Version 02 (Content Revision 03).

Draft Text for "95C" Phyical Layer. (Revision 4), Part 1, Document #531-981-20814-95C, part 1 on 3GGP2 website (ftp://ftp.3gpp2.org/tsgc/working/1998/1298_Maui/WG3-TG1/531-9812014-95c,%20part5202.pdf,1998).

Draft Text for "95C" Phyical Layer. (Revision 4), Part 2, Document #531-981-20814-95C, part 2 on 3GGP2 website (ftp://ftp.3gpp2.org/tsgc/working/1998/1298_Maui/WG3-TG1/531-9812014-95c,%20part5202.pdf,1998).

Ejzak et al., "Lucent Technologies Air Interface Proposal for CDMA High Speed Data Service," Revision 0.1, May 5, 1997.
Ejzak et al., "Lucent Technologies Air Interface Proposal for CDMA High Speed Data Service," Apr. 14, 1997.
Ejzak, et al. "Proposal for High Speed Packet Data Service, Version 0.1," Lucent Technologies, Jan. 16, 1997.
Elhakeem, "Congestion Control in Signaling Free Hybrid ATM/CDMA Satellite Network," IEEE, 1995, pp. 783-787.
Goodman, "Wireless Personal Communications Systems," (1997).
Hagenauer, "Rate-Compatible Puncture Convolutional Codes (RCPC Codes) and their Applications," IEEE Transactions on Communications, 36 (4): pp. 389-400 (Apr. 1988).
Hall et al., "Design and Analysis of Turbo Codes of Rayleigh Fading Channels," IEEE Journal on Selected Areas in Communications, vol. 16, No. 2, Feb. 1998, pp. 160-174.
High Data Rate (HDR) Solution, Qualcomm, Dec. 1998.
High Data Rate (HDR), cdmaOne optimized for high speed, high capacity data, Wireless Infrastructure, Qualcomm, Sep. 1998.
Hindelang et al., "Using Powerful "Turbo" Codes for 14.4 Kbit/s Data Service in GSM or PCS Systems," IEEE Global Communications Conference, Phoenix, Arizona, USA Nov. 3-8, 1997 vol. 11, pp. 649-653.
Honkasalo, Harri, "High Speed Data Air Interface," 1996.
I et al., "Multi-Code CDMA Wireless Personal Communications Networks", Proceedings IEEE ICC 1995: 1060-1064.
I et al., "IS-95 Enhancements for Multimedia Services," Bell Labs Technical Journal, pp. 60-87, Autumn 1996.
I et al., "Load and Interference Based Demand Assignment (LIDA) for Integrated Services in CDMA Wireless Systems," Nov. 18, 1996, pp. 235-241.
I et al., "Performance of Multi-Code CDMA Wireless Personal Communications Networks," Jul. 25, 1995.
I et al., "Variable Spreading Gain CDMA with Adaptive Control for True Packet Switching Wireless Network," 1995, pp. 725-730.
Introduction to cdma2000 Spread Spectrum Systems, Release C. TIA/EIA Interim Standard. TIA/EIA/IS-2000.1-C. May 2002.
Kaiser et al., "Multi-Carrier CDMA with Iterative Decoding and Soft-Interference Cancellation", IEEE Global Communications Conference, Phoenix, AZ, USA, vol. I: 523-529, (Nov. 3-8, 1997).
Knisely, "Lucent Technologies Air Interface Proposal for CDMA High Speed Data Service," Jan. 16, 1997.
Knisely, "Telecommunications Industry Association Subcommittee TR-45.5—Wideband Spread Spectrum Digital Technologies Standards," Banff, Alberta. Feb. 24, 1997 (TR45.5/97.02.24)21.
Knisely, "Telecommunications Industry Association Subcommittee TR-45.5—Wideband Spread Spectrum Digital Technologies Standards," Working Group III—Physical Layer. Banff, Alberta. Feb. 24, 1997 (TR45.5/97.02.24)22.
Kryzmien et al., "Rapid Acquisition Algorithms for Synchronization of Bursty Transmissions in CDMA Microcellular and Personal Wireless Systems," IEEE Journal on Selected Areas in Communications, vol. 14, No. 3, Apr. 1996, pp. 570-579.
Kumar et al., "An Access Scheme for High Speed Packet Data Service on IS-95 based CDMA," Feb. 11, 1997.
Lau et al., "A Channel-State-Dependent Bandwidth Allocation scheme for Integrated Isochronous and Bursty Media Data in a Cellular Mobile Information System," IEEE, 2000, pp. 524-528.
Lin, S., et al., "Automatic-Repeat-Request Error-Control Schemes," IEEE Communications Magazine, 22 (12): pp. 5-17 (Dec. 1984).
Liu et al., "Channel Access and Interference Issues in Multi-Code DS-CDMA Wireless Packet (ATM) Networks," Wireless Networks 2, pp. 173-196, 1996.
Lucent Technologies Presentation First Slide Titled, Summary of Multi-Channel Signaling Protocol, Apr. 6, 1997.
Lucent Technologies Presentation First Slide Titled, Why Support Symmetric HSD (Phase 1C), Feb. 21, 1997.
Mobile Station—Base Station Compatibility Standard for Dual-Mode Wideband Spread Spectrum Cellular System, TIA Interim Standard, TIA/EIA/IS-95-A (Addendum to TIA/EIA/IS-95), May 1995.
Mobile Station-Base Station Compatibility Standard for Wideband Spread Spectrum Cellular Systmes, TIA/EIA Standard, TIA/EIA-95-B (Upgrade and Revision of TIA/EIA-95-A), Mar. 1999.
Motorola, Version 1.0. Motorola High Speed Data Air Interface Proposal Comparisions and Recommendations. Jan. 27, 1997.
MSC-BS Interface (A-Interface) for Public 800 MHz. TIA/EIA/IS-634-A. TIA/EIA Interim Standard (Revision of TIA/EIA/IS-634) Jul. 1998.
MSC-BS Interface for Public 800 MHz.TIA/EIA/IS-634. TIA/EIA Interim Standard, Dec. 1995.
Network Wireless Systems Offer Business unit (NWS OBU), Feature Definition Document for Code Division Multiple Access (CDMA) Packet Mode Data Services, FDD-1444, Nov. 26, 1996.
Ott, "TR45.5, CDMA WBSS Technical Standards Meeting Summary," Feb. 24-28, 1997 Banff, Alberta.
Packet Data service Option Standard for Wideband Spread Spectrum Systems, TIA/EIA Interim Standard, TIA/EIA/IS-657, Jul. 1996.
Physical Layer Standard for cdma2000 Spread Spectrum Systems, Release C. TIA/EIA Interim Standard. TIA/EIA/IS-2000.2C. May 2002.
Pulleston, "PPP Protocol Spoofing Control Protocol," Global Village Communication (UK) Ltd., Feb. 1996.
Reed et al., "Iterative Multiuser Detection for CDMA with FEC: Near-Single-User Performance," IEEE Transactions on Communications, vol. 46, No. 12, Dec. 1998, pp. 1693-1699.
Shacham, et al., "A Selective-Repeat-ARQ Protocol for Parallel Channels and Its Resequencing Analysis," IEEE Transactions On Communications, XP000297814, 40 (4): 773-782 (Apr. 1997).
Shacham, N., "A Selective-Repeat-ARQ Protocol for Parallel Channels and Its Resequencing Analysis," IEEE Transactions on Communications, 40 (4): pp. 773-782 (Apr. 1992).
Simpson, W. (Editor). "RFC 1661—The Point-to-Point Protocol (PPP)." Network Working Group, Jul. 1994, pp. 1-35. http://www.faqs.org/rfcs/rfc1661.html.
Simpson, W. (Editor). "RFC 1662—PPP in HDLC-Like Framing." Network Working Group, Jul. 1994, pp. 1-17. http://www.faqs.org/rfcs/rfc1662.html.
Skinner et al., "Performance of Reverse-Link Packet Transmission in Mobile Cellular CDMA Networks," IEEE, 2001, pp. 1019-1023.
Stage 1 Service Description for Data Services—High Speed Data Services (Version 0.10) CDG RF 38. Dec. 3, 1996.
Support for 14.4 kbps Data Rate and PCS Interaction for Wideband Spread Spectrum Cellular Systems. TSB74, Dec. 1995. TIA/EIA Telecommunications Systems Bulletin.
*Tantivy Communication, Inc. v. Lucent Technologies, Inc.* Markman Order Civil Action No. 2:04-CV-79 (Aug. 11, 2005).
Telecommunications Industry Association Meeting Summary. Task Group I, Working Group III, Subcommittee TR45.5. Feb. 24-27, 1997. Banff, Alberta.
Telecommunications Industry Association Meeting Summary. Task Group I, Working Group III, Subcommittee TR45.5. Jan. 6-8, 1997. Newport Beach, California. (Tiedemann, pp. 4-8).
Third Generation Partnership Project, "Technical Specification Group (TSG) Radio Access Network (RAN); Working Group 1 (WG1); Physical Channels and Mapping of Transport Channels onto Physical Channels (FDD)," 3GPP TS 25.211 v2.0.0 (Apr. 1999).
Third Generation Partnership Project, "Technical Specification Group (TSG) Radio Access Network (RAN); Working Group 1 (WG1); Multiplexing and Channel Coding (FDD)," 3GPP TS 25.212 v1.0.0 (Apr. 1999).
Third Generation Partnership Project, "Technical Specification Group (TSG) Radio Access Network (RAN); Working Group 1 (WG1); Spreading and Modulation (FDD)," 3GPP TS 25.213 v2.0.0 (Apr. 1999).
Upper Layer (Layer 3) Signaling Standard for cdma2000 Spread Spectrum Systems, Release C. TIA/EIA Interim Standard. TIA/EIA/IS-2000.5-C. May 2002.

Viterbi, "A Constructive (Backward Compatible) Approach for Migration to Wider Band Wireless Services," Qualcomm Incorporated, 3$^{rd}$ Generation Wider Band CDMA Technology Conference, Atlanta, Georgia, Feb. 25, 1998.

Viterbi, "The Path to Next Generation Services with CDMA Qualcomm Incorporated," 1998 CDMA Americas Congress, Los Angeles, California, Nov. 19, 1998.

Wang et al., "The Performance of Turbo-Codes in Asynchronous DS-CDMA," IEEE Global Communications, Phoenix, Arizona, USA, Nov. 3-8, 1007, vol. III, pp. 1548-1551.

Wang, et al, "Spread Spectrum Multiple-Access with DPSK Modulation and Diversity for Image Transmission over Indoor Radio Multipath Fading Channels," IEEE Transactions on Circuits and Systems for Video Technology, 6 (2): 200-214 (1996).

www.cdg.org/news/press/1997.asp. CDA Press Release Archive, 1997.

* cited by examiner

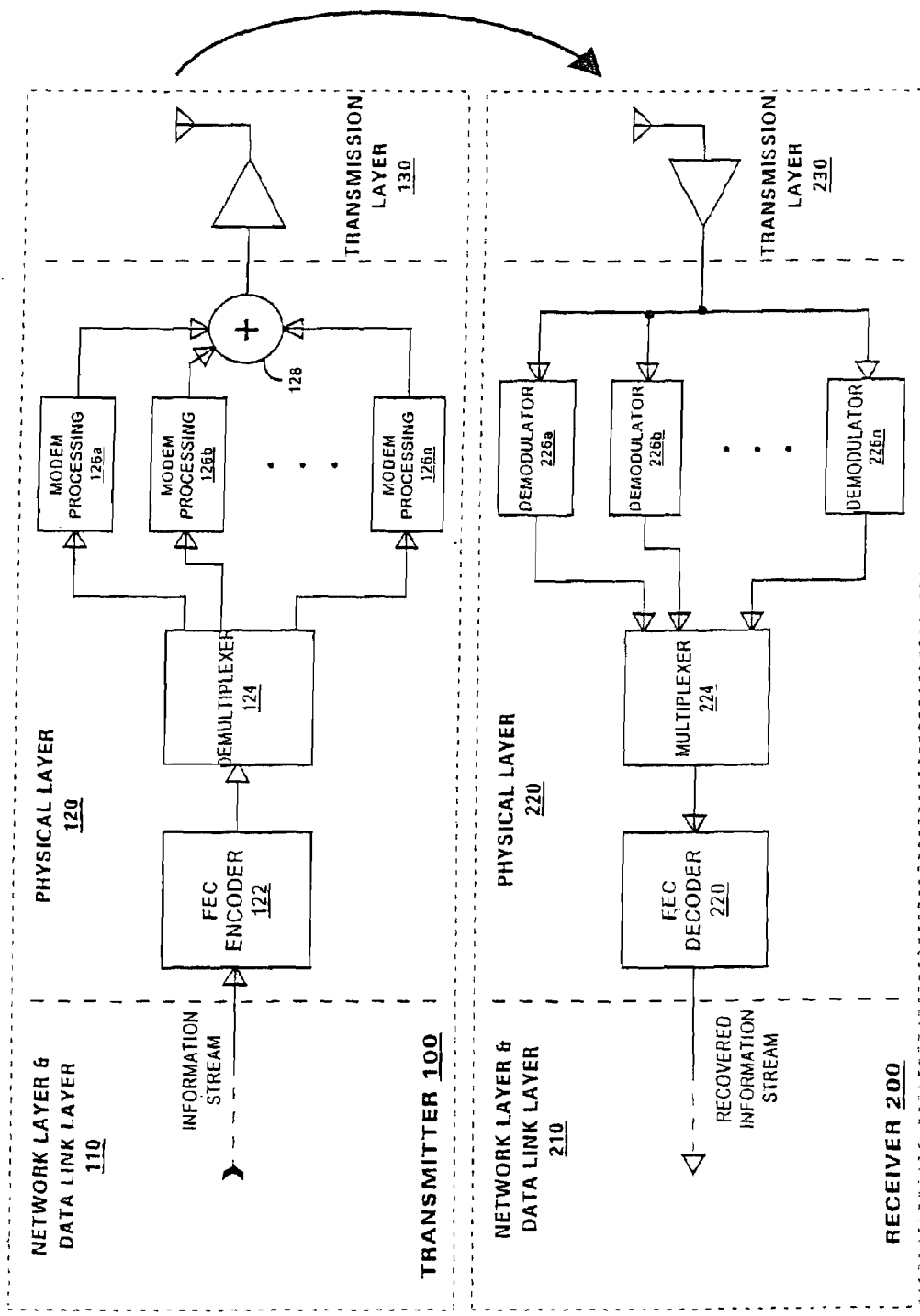

FORWARD ERROR CORRECTION SCHEME FOR HIGH RATE DATA EXCHANGE IN A WIRELESS SYSTEM

RELATED APPLICATIONS

This application is a continuation of U.S. patent application Ser. No. 10/634,148, filed Aug. 4, 2003, now U.S. Pat. No. 7,366,154, which is a continuation of U.S. application Ser. No. 09/301,484, filed Apr. 28, 1999, now U.S. Pat. No. 6,614,776, which was reexamined in Ser. No. 90/008,982, the entire teachings of which are incorporated herein by reference.

BACKGROUND OF THE INVENTION

The present invention provides a low latency error correction mechanism for high data rate transmissions over multiple traffic channels in a wireless communication system.

It is known to include forward error correction ("FEC") coding and decoding to information signals that are to be transmitted over a wireless channel. Forward error correction, generally speaking, introduces predetermined redundancy into an information signal to permit a receiver to identify and perhaps correct errors that may have been introduced by a transmission medium. For example, the known IS-95 standard for code division multiple access cellular communication specifies a type of convolutional code for each traffic channel transmitted from base station to mobile station or vice versa.

Recently, it has been proposed to provide high data rate exchanges over a wireless communication system. Such high data rate exchanges may be used, for example, to facilitate data transfer for computing applications or for video conferencing applications. In one such proposal, a high rate data signal may be communicated to a receiver over a plurality of parallel traffic channels. For example, the recently proposed IS-95 B standard proposes use of parallel CDMA channels each having a data rate of 9.6 KB/s to provide a higher data rate communication. In such systems, a high rate data signal is demultiplexed into a plurality of lower rate data signals and each of these signals is processed in an independent traffic channel. Thus, each lower rate data signal has FEC applied to it.

Another example of a wireless CDMA system is titled "Dynamic Frame Size Adjustment And Selective Reject On A Multi-Link Channel To Improve Effective Throughput And Bit Error Rate," Ser. No. 09/030,049 filed Apr. 28, 1999, now U.S. Pat. No. 6,236,647, the disclosure of which is incorporated herein.

Wireless communication channels are inherently "noisy" due to channel impairments caused by atmospheric conditions, multipath effects, co-channel interference and the like. Particularly if used for computing applications, where executable content may be expected to be exchanged over traffic channels, the need for powerful FEC techniques will continue to be prevalent.

Use of more powerful FEC techniques in such wireless systems may increase the latency of data requests. For example, the known turbo codes require large blocks of data to be received entirely by a decoder before decoding can begin. Latency refers generally to the delay that extends from the time a request for data is issued by a user and the time when data responsive to the request is presented to the user. FEC introduces decoding delays at a wireless receiver and, thus, contributes to latency. There is a need in the art for a wireless communication system that provides high data rate exchange having high quality FEC with low latency.

SUMMARY OF THE INVENTION

Embodiments of the present invention provide a transmitter/receiver system for high data transfer in a wireless communication system in which a physical layer processor comprises an FEC coder, a demultiplexer and a plurality of modem processors. The FEC coder applies error correction codes to the high data rate signal. Thereafter, the demultiplexer distributes portions of the coded high data rate signal to the modem processors. Each modem processor processes its respective portion of the coded signal for transmission in an independent channel.

BRIEF DESCRIPTION OF THE DRAWING

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 1 illustrates a transmitter and a receiver each constructed in accordance with embodiments of the present invention.

DETAILED DESCRIPTION OF THE INVENTION

The present invention provides low latency forward error correction for a high data rate wireless transmission by applying forward error correction codes to data prior to multiplexing the data across a plurality of parallel fixed bandwidth traffic channels.

FIG. 1 is a block diagram of a transmitter 100 and a receiver 200 each constructed according to embodiments of the present invention. The transmitter 100 and receiver 200 are illustrated as operating in a layered communication system that includes a transmission layer (130, 230), a physical layer (120, 220) and higher layer communications such as network layers and data link layers (collectively labeled 110 and 210). As is known, in the transmission layer 130, a transmitter 100 performs carrier modulation, amplification and transmission upon digital data to be transmitted. Also as is known, in the transmission layer 230, a receiver 200 performs reception, amplification and carrier demodulation to obtain a recovered digital data signal. The higher layers 110, 210 of the communication system also may process an information signal as may be required for the application for which the present invention is to be used.

According to an embodiment of the present invention, the physical layer 120 of the transmitter 100 may be populated by an FEC coder 122, a demultiplexer 124 and a plurality of modem processors 126a-126n. The number of modem processors 126a-126n may vary and also may be determined by the quantity of data to be transmitted and the capacity of each of the traffic channels over which the data may be transmitted. The FEC coder 122 receives a source signal from a higher layer 110 in the transmitter and enhances it with an error correction code. The enhanced information signal is output from the FEC coder 122 to the demultiplexer 124. The demultiplexer distributes the information signal to the modem processors 126a-126n. The modem processors 126a-126n each format their respective portions of the enhanced signal for transmission. Outputs from the modem processors 126a-126n are summed by an adder 128 and delivered to the transmission layer 130.

At the receiver 200, the physical layer 220 performs processing that is the inverse of the processing that had been applied in the physical layer 120 of the transmitter 100. The physical layer 220 may be populated by an FEC decoder 222, a multiplexer 224 and a plurality of demodulators 226a-226n. There will be one demodulator 226a-226n for each of the traffic channels that had been allocated to carry the enhanced information signal. The recovered digital signal from the transmission layer 230 is input to each of the demodulators 226a-226n. Each demodulator 226a-226n outputs a recovered portion of the enhanced information signal. The multiplexer 224 merges each of the recovered portions of the enhanced information signal into a unitary recovered enhanced information signal. The FEC decoder 222 performs error detection and correction using error correction codes that had been introduced by the FEC coder 122 in the transmitter 100. The FEC decoder 222 outputs a corrected information signal to the higher layers 210 of the receiver 200.

In a CDMA embodiment, which is shown in FIG. 1, a receiver 200 need not include an element corresponding to the adder 128 of the transmitter 100; the demodulators 226a226n each perform correlation. As is known, correlation permits a modem processor to discriminate a desired CDMA signal from other CDMA signals that may be present in an aggregate received signal. Thus, in the embodiment of FIG. 1, the demodulators 226a-226n identify and output respective portions of the recovered enhanced information signal.

According to an embodiment of the present invention, the FEC coder 122 and FEC decoder 222 may generate and decode iterative systematic nested codes, also known as "turbo" codes. These turbo codes provide an advantage in that the FEC decoding process may be repeated iteratively to improve the information signal recovered therefrom. Thus, the output of a first iteration may be reintroduced to the FEC decoding block (path not shown in FIG. 1) for subsequent iterations. The nature of the turbo codes generates improved corrected data at subsequent iterations.

The known turbo codes, however, introduce a predetermined amount of latency into the decoding process. Turbo codes operate on blocks of a predetermined size. For example, one turbo code being considered for a wireless communication system for computer network applications possesses a block size of 4,096 channel symbols. An FEC decoder 222 must decode an entire block before a recovered information signal becomes available for the block. This characteristic may be contrasted with convolutional codes which are used in the known IS-95 standard for CDMA cellular communication; convolutional codes are characterized by relatively smaller latency for same-sized block (relative to turbo codes) because it is not necessary to receive an entire block before decoding may begin. It is believed that by distributing the FEC code among several parallel traffic channels as is shown in FIG. 1, the higher aggregate throughput of the traffic channels ameliorates the latency that would otherwise be introduced by the turbo code.

For high data rate applications using plural parallel traffic channels, it is believed that use of turbo codes achieves a higher figure of merit (lower $E_b/N_0$) than for convolutional codes. Using the example of a 4,096 channel symbol sized block and $E_b/N_0$ of 1.5 dB the turbo code provides a BER of $10^{-6}$. By contrast, for voice systems requiring a less stringent $10^{-3}$ BER, a convolutional code requires an $E_b/N_0$ of 7 dB or more.

The techniques of the present invention find application in a variety of wireless communication systems including CDMA systems. Typically, in application, the base stations and subscriber stations of the wireless communication system will include functionality of both the transmitter and receiver of FIG. 1. That is, to provide two-way communication, a base station will include a transmitter portion 100 and a receiver portion 200. So, too, with the subscriber terminal. The base stations and subscriber terminals may but need not be configured to provide simultaneous full-duplex communication.

Typically, a base station of a wireless communication system transmits a plurality of data signals to a variety of subscribers simultaneously. According to an embodiment of the present invention, each base station may perform the techniques disclosed herein simultaneously on a number of high rate data signals. It is consistent with the spirit and scope of the present invention that each signal may have a data rate that is independent of the data rates of the other signals. Thus, in such a case, a base station may be configured to include its FEC coder/decoders 122, 222 and modem processor/demodulators 126a, 226a in a pooled configuration. Such an embodiment permits the base station to assign, for example, a variable number of modem processors 126a-126n to a data signal depending upon the rate of the signal to be transmitted. Similarly, by including a pool of FEC coders 122 (shown singly in FIG. 1) in a base station, the base station may selectively enable FEC coders 122 as the base station receives new data signals to be transmitted to subscribers. Provision of base station processing components in a pooled arrangement is well-known.

Several embodiments of the present invention are specifically illustrated and described herein. However, it will be appreciated that modifications and variations of the present invention are covered by the above teachings and within the purview of the appended claims without departing from the spirit and intended scope of the invention.

What is claimed is:

1. A code division multiple access (CDMA) transmitter, the CDMA transmitter comprising:
    a forward error correction (FEC) coder configured to receive a source signal, which corresponds to a subframe and includes an appended cyclic redundancy check code (CRC), and to produce an enhanced source signal including data coded with error correction information;
    a demultiplexer configured to demultiplex the enhanced source signal;
    a plurality of modem processors configured to process respective portions of the enhanced source signal in a plurality of independent channels;
    an adder configured to produce an aggregate signal, which is a summation of the enhanced signal processed in the plurality of independent channels; and
    a transmitter configured to transmit the aggregate signal.

2. The CDMA transmitter of claim 1, wherein the transmitter is further configured to retransmit the subframe, if it is received in error by a receiver.

3. The CDMA transmitter of claim 1, wherein data of the subframe is associated with a sequence number.

4. The CDMA transmitter of claim 3, wherein the sequence number designates the order in which the subframe is sent over a subchannel.

5. A code division multiple access (CDMA) receiver, the CDMA receiver comprising:
    a receiver configured to receive a wireless signal from a transmitter, the wireless signal being formed at the transmitter by a summation of portions of a coded signal that were processed in independent channels but were wirelessly transmitted as a single aggregate signal, wherein the wireless signal corresponds to a subframe and includes an appended cyclic redundancy check code (CRC);

a plurality of demodulators configured to demodulate an output of the receiver; and a forward error correction (FEC) decoder to recover a single unitary information signal.

6. The CDMA receiver of claim 5, wherein the transmitter is further configured to retransmit the subframe if it is received in error by a receiver.

7. The CDMA receiver of claim 5, wherein data of the subframe is associated with a sequence number.

8. The CDMA receiver of claim 7, wherein the sequence number designates the order in which the subframe is sent over a subchannel.

9. A signal processor configured to transmit a code division multiple access (CDMA) encoded signal, the signal processor comprising:

a forward error correction (FEC) encoder configured to receive a source signal and to apply an error correction code, wherein the source signal corresponds to a subframe, and the source signal has an appended cyclic redundancy check code (CRC);

a demultiplexer configured to output at least two demultiplexed encoded signals;

a plurality of modem processors, each configured to modulate the at least two demultiplexed encoded signals to produce a respective one of a plurality of transmission code modulated signals;

an adder configured to generate an aggregate signal; and a transmitter configured to transmit the aggregate signal.

10. The processor of claim 9, wherein the transmitter is further configured to retransmit the subframe if it is received in error by a receiver.

11. The processor of claim 10, wherein data of the subframe is associated with a sequence number.

12. The processor of claim 11, wherein the sequence number designates the order in which the subframe is sent over a subchannel.

13. A method of transmitting a high data rate signal over a wireless radio channel, the method comprising:

enhancing the high data rate signal with a forward error correction (FEC) code, wherein the high data rate signal corresponds to a subframe and includes an appended cyclic redundancy check code (CRC);

distributing the enhanced high data rate signal over a plurality of demultiplexed signals;

encoding each of the plurality of demultiplexed signals with a code division multiple access (CDMA) transmission code;

summing the plurality of CDMA transmission encoded signals to produce an aggregate signal; and modulating the aggregate signal.

14. The method of claim 13, further comprising:

retransmitting the subframe if the subframe is received in error by receiver.

15. The method of claim 13, wherein data of the subframe is associated with a sequence number.

16. The method of claim 15, wherein the sequence number designates the order in which the subframe is sent over a subchannel.

* * * * *

UNITED STATES PATENT AND TRADEMARK OFFICE
CERTIFICATE OF CORRECTION

| | | |
|---|---|---|
| PATENT NO. | : 8,045,536 B2 | Page 1 of 1 |
| APPLICATION NO. | : 12/110930 | |
| DATED | : October 25, 2011 | |
| INVENTOR(S) | : James A. Proctor, Jr. | |

It is certified that error appears in the above-identified patent and that said Letters Patent is hereby corrected as shown below:

ON THE TITLE PAGE

Item (56) U.S. PATENT DOCUMENTS, page 1, right column, line 1, after "5,027,348 A 6/1991", delete "Curry" and insert --Curry, Jr.--.

Item (56) U.S. PATENT DOCUMENTS, page 2, left column, line 3, after "5,608,725 A 3/1997", delete "Grube" and insert --Pendleton--.

Item (56) U.S. PATENT DOCUMENTS, page 2, left column, line 55, after "6,307,840 B1 10/2001", delete "Wheatleyl" and insert --Wheatley--.

Item (56) OTHER PUBLICATIONS, page 4, left column, line 10, after "USA, Nov. 3-8," delete "1007" and insert --1997--.

Signed and Sealed this
Fifteenth Day of May, 2012

David J. Kappos
*Director of the United States Patent and Trademark Office*